United States Patent [19]
Onizuka et al.

[11] Patent Number: 5,857,863
[45] Date of Patent: Jan. 12, 1999

[54] AUTOMOBILE INSTRUMENT PANEL HARNESS-CONNECTING CONSTRUCTION

[75] Inventors: Takahiro Onizuka; Yasuhiro Hattori, both of Nagoya, Japan

[73] Assignees: Harness System Techologies Research, Ltd., Yokkaichi; Sumitomo Wiring Systems, Ltd., Mie; Sumitomo Electric Industries, Ltd., Osaka, all of Japan

[21] Appl. No.: 755,008

[22] Filed: Nov. 22, 1996

[30]     Foreign Application Priority Data

Nov. 28, 1995  [JP]  Japan ................................ 7-308909
Nov. 30, 1995  [JP]  Japan ................................ 7-312322

[51] Int. Cl.$^6$ ......................... H01R 13/621; H01R 13/74
[52] U.S. Cl. .......................................... 439/248; 439/364
[58] Field of Search ............................. 439/34, 247, 248, 439/364

[56]             References Cited

U.S. PATENT DOCUMENTS

| | | | |
|---|---|---|---|
| 4,830,621 | 5/1989 | Maue et al. ............................. | 439/723 |
| 4,942,499 | 7/1990 | Shibata et al. ........................... | 439/34 |
| 4,954,085 | 9/1990 | Inoue et al. .............................. | 439/364 |
| 5,138,679 | 8/1992 | Edwards et al. ......................... | 439/248 |
| 5,615,080 | 3/1997 | Nishitani et al. ........................ | 361/818 |
| 5,642,999 | 7/1997 | Kidd et al. ............................... | 439/34 |
| 5,676,552 | 10/1997 | Fukuda et al. ............................ | 439/34 |
| 5,711,630 | 1/1998 | Kodama .................................. | 403/329 |

FOREIGN PATENT DOCUMENTS

U-1-142345  9/1989  Japan .

*Primary Examiner*—Neil Abrams
*Attorney, Agent, or Firm*—Oliff & Berridge, PLC

[57]            ABSTRACT

A pair of electric connection boxes are mounted respectively on a large-size instrument panel and a body panel in an automobile and have respective collective-connecting connector portions. One or both of the electric connection boxes is movably supported through resilient support members (for example 27) such as rubber pieces or springs within an outer frame which is fixedly mounted on the associated panel so as to be self-aligning when the boxes are joined. A bolt (for example 58) is used to fix the connector portions (for example 33, 45) together and also to secure the instrument panel (for example 10) to the body panel (for example 14). In another embodiment, (FIGS. 5–7) an insulating plate (for example 123) having bus bars (for example 122) is resiliently supported within a casing formed by housing parts (for example 120, 121) which are fixed to an instrument panel (for example 110). Tabs (for example 122a) extend from the bus bars for mating with contacts in an opposed connection box (for example 115) mounted to a body panel (for example 114). A connection box (for example 125), a fuse and relay box (for example 126) and a wiring harness connector (for example 127) extend from the insulating plate (for example 123).

3 Claims, 7 Drawing Sheets

AUTOMOBILE INSTRUMENT PANEL HARNESS-CONNECTING CONSTRUCTION

BACKGROUND OF THE INVENTION

This invention relates to an electric connection box construction for an automobile and also to an instrument panel harness-connecting construction having this electric connection box construction. More specifically the invention relates to a construction in which a pair of electric connection boxes are attached respectively to a body panel and an instrument panel, and are fitted together at their connector portions. The efficiency of mounting instrument panel harnesses is improved by the use of these electric connection boxes.

In a conventional construction, two kinds of wire harnesses, that is, an instrument panel harness and a cowl harness, are arranged between an instrument panel and a cowl panel of a body in an automobile. Both the instrument panel harness and the cowl harness include a power wire, a signal wire and an earth or ground wire in a mixed manner. An electric connection box 1, comprising a junction box (shown in FIGS. 1 and 2) to be connected to these wire harnesses, is assembled in such a manner that the electric connection box 1 is connected to either the instrument panel harness W/H1 or the cowl harness W/H2 through a connector.

Figure 1:
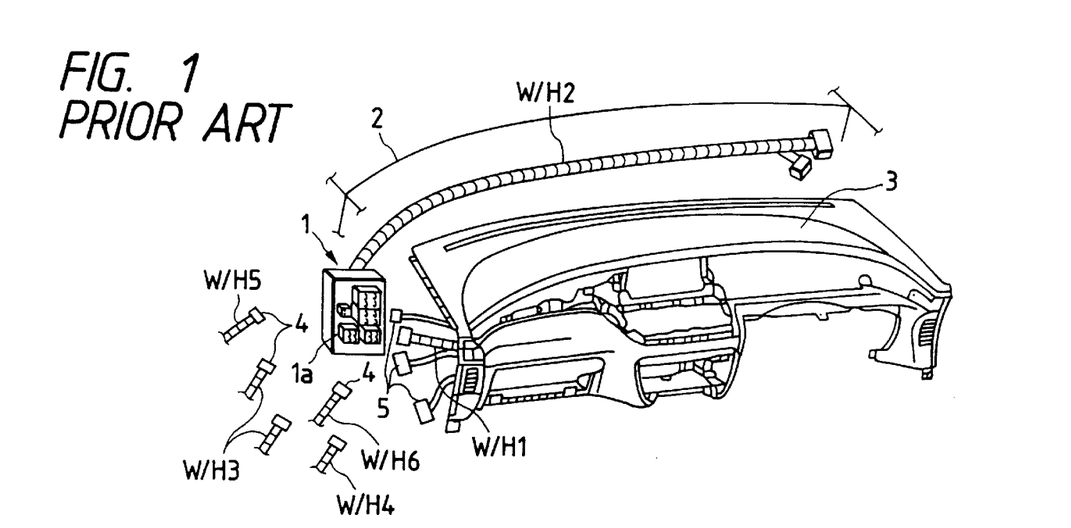
FIG. 1 is a perspective view showing a junction box for electrically connecting an instrument panel harness and a cowl harness together in a conventional construction.
Figure 2:
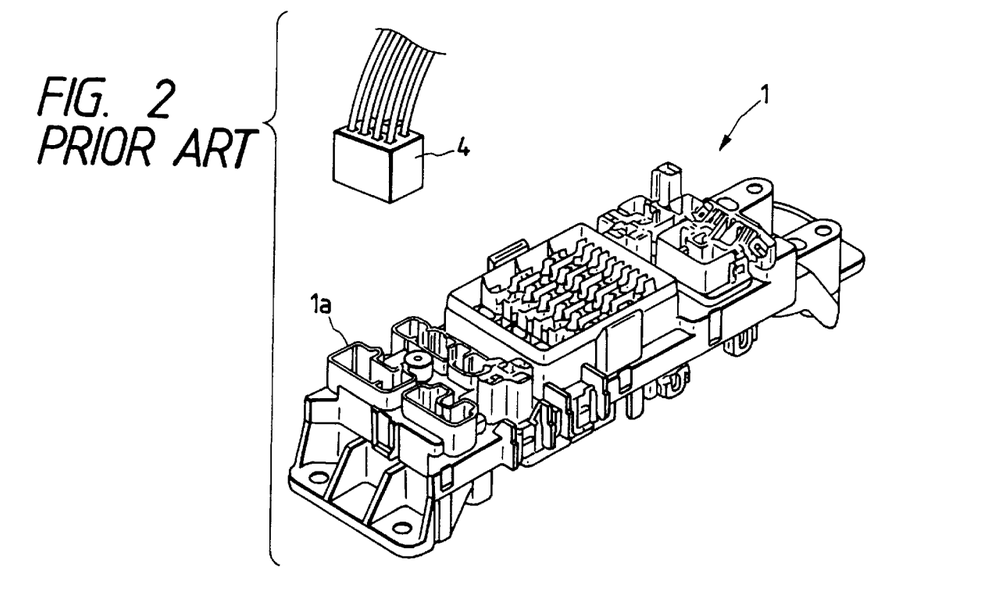
FIG. 2 is a perspective view of the junction box of FIG. 1.

In an automobile assembly line, the cowl harness W/H2 is arranged along a cowl panel 2 of the body, and is fixed by clamps while the instrument panel harness W/H1 is arranged along an instrument panel 3, and is fixed by clamps. In this condition, the instrument panel 3 is attached to the cowl panel 2. Then, connectors 4 of a front harness W/H3, a floor harness W/H4, a roof harness W/H5 and a door harness W/H6 are fitted respectively in connector fitting portions 1a of the electric connection box 1. A connector of either the instrument panel harness or the cowl harness (whichever one is not connected to the electric connection box 1 above) is fitted in the connector fitting portion 1a of the electric connection box 1. After all the necessary connectors are fitted in the electric connection box 1, the electric connection box 1 is fixed to the body panel at the cowl side.

As described above, when connecting many connectors to the electric connection box, the operator's hands must be extended into a blind space between the cowl panel 2 on the body and the instrument panel 3 from the lower side so as to effect this connecting operation. Also, the operator must crouch and stoop during the connecting operation, which imposes a large physical burden on the operator. Further, since the floor harness, the front harness, the roof harness, the door harness and either the instrument panel harness or the cowl harness must be connected to the electric connection box, many connectors must be fitted in the electric connection box, much time is required for the connector-connecting operation.

Further, after many connectors are connected to the electric connection box, the electric connection box must be fixed to the body at the cowl side, and this fixing operation must be effected in a blind manner, and hence is not easy. Thus, a problem has been encountered in that the fitting of the connectors in the conventional electric connection box, as well as the fixing of the electric connection box to the body, can not be effected efficiently.

To deal with the above problems, and more specifically to easily connect wire harnesses (which are to be mounted respectively on an instrument panel and a body) together, there has recently been proposed a construction (Japanese Utility Model Unexamined Publication No. 1-142345) in which a connector of the instrument panel-side wire harness and a connector of the body-side wire harness are fixed respectively to the instrument panel and the body in opposed relation to each other, and simultaneously when attaching the instrument panel to the body, the connectors are connected together.

However, it is not easy to fit the multi-pole connectors, fixed respectively to the instrument panel and the body, together simultaneously when attaching the large-size instrument panel to the body. For example, even though the precision of the fixed position of each connector is enhanced, the fitting of the connectors can not be effected easily if the direction of mounting of the instrument panel is even slightly deviated.

SUMMARY OF THE INVENTION

The present invention has been made in view of the above problems, and an object of the invention is to provide an electric connection box construction in which the connection of wire harnesses, arranged between an instrument panel and a body, can be effected easily, and by the use of this electric connection box, instrument panel harnesses can be easily connected to other wire harnesses at one time, thereby reducing the time and labor required for the operation.

To achieve the above object, according to the invention, there is provided an electric connection box construction for an automobile in which a pair of electric connection boxes are mounted respectively on large-size panels in the automobile, and have respective connector portions fitted together; one or each of the electric connection boxes being movably supported within an outer frame, which is fixedly mounted on the associated panel, through resilient support members.

Specifically, each of the resilient support members comprises a rubber member or a spring with one end of the resilient support member fixed to the outer frame while the other end thereof is fixed to an outer surface of the electric connection box. The resilient support members are spaced from one another, and the electric connection box is movable within the outer frame so as to absorb a dimensional error.

The electric connection box is movably mounted on the large-size panel as described above, and with this construction the connector portion of the electric connection box can be easily fitted in the mating connector portion while absorbing a dimensional error. Particularly when the connectors are of the multi-pole type, the two connector portions cannot be easily fitted together if the two electric connection boxes are fixed. However, if one or each of the two electric connection boxes is movable so as to absorb a dimensional error, this fitting operation can be effected smoothly.

Further, according to the invention, there is provided an instrument panel harness-connecting construction wherein a pair of electric connection boxes are mounted respectively on an instrument panel and a body panel. The electric connection box mounted on the instrument panel has a collective-connecting connector portion for connection to instrument panel harnesses and for connection to wire harnesses mounted on a body. The electric connection box mounted on the body panel has a first collective-connecting connector portion for fitting connection to the collective-connecting connector portion, and a plurality of second connector portions for fitting to connectors connected to a front harness, a floor harness, a roof harness and a door harness.

Where the connector portions of the two electric connection boxes, which are to be fitted together simultaneously when attaching the instrument panel of a large size to the body panel, are fixed to the panels, the two connector portions can not be easily fitted together if they are even slightly out of registry with each other. However, when one or both of the two electric connection boxes are movable, the connector fitting operation can be carried out easily even when a dimensional error is produced by a slightly deviated direction of mounting of the instrument panel.

For example, the electric connection box mounted on the instrument panel is movable relative to an outer frame while the other electric connection box is fixedly mounted on the body panel.

The function of the conventional junction box (fixed to the body panel after the instrument panel is attached to the body panel) is divided into that of the electric connection box, beforehand attached to the instrument panel, and that of the electric connection box beforehand attached to the body panel. Simultaneously when fixing the instrument panel to the body panel, the two electric connection boxes are fitted together, thereby connecting the instrument panel harnesses to the other wire harnesses at one time. With this construction, the connector fitting operation can be effected for all the connectors at one time, in contrast with the conventional construction, and therefore the time and labor required for the operation are greatly reduced. Specifically, it is no longer necessary, after the instrument panel is attached to the body panel, to fit the connectors of the wire harnesses into the electric connection box or to fix the electric connection box to the body after this connector fitting operation.

Relays and fuses are mounted on the electric connection box mounted on the instrument panel. The electric connection box mounted on the body panel comprises a connector block having an internal circuit connecting the second connector portions to the first connector portion.

Preferably, the collective-connecting connector portion is fixed by a fastening member, and the fastening member also serves to fix the instrument panel and the body panel together.

When the two electric connection boxes, at least one of which is movable, are thus fastened and fixed together by the fastening member such as a bolt, the shaking of the electric connection boxes due to vibrations developing during the travel of the automobile is prevented. Further, since the fastening member is also used to fix the instrument panel to the body panel, the time and labor required for the operation are reduced.

Preferably, the instrument panel harnesses include a cowl harness that does not include a power circuit, and the power circuit is connected to the electric connection box mounted on the body panel.

Two kinds of wire harnesses (that is, an instrument panel harness and a cowl harness), which have been separate from each other in the conventional construction, are combined together into the wire harnesses mounted on the instrument panel except for the wire connected to the power circuit. Therefore only one large-size wire harness needs to be arranged in a narrow space between the instrument panel and the body panel, enhancing the efficiency of the operation.

Furthermore, according to the invention, there is provided an electric connection box in which an insulating plate, having a bus bar fixed thereto, is mounted within a casing, comprising an upper case and a lower case, through resilient support members so that the insulating plate is movable relative to the casing. Connectors are fittingly connected to tabs formed on the bus bar, and the connectors are inserted into the casing through respective connector fitting holes formed through the upper case and/or the lower case. The connectors project outwardly from the casing in such a manner that a gap is formed between an outer peripheral surface of each of the connectors and a peripheral edge of the associated connector fitting hole so that when each of the connectors is to be fitted in a mating connector, it is movable to a fitting position.

In the above construction, the connectors mounted on the electric connection box are movable relative to the casing, and therefore when each connector is to be fitted in the mating connector, it can be easily fitted in the mating connector while absorbing a dimensional error. Particularly when the connectors are of the multi-pole type, the two connector portions can not be easily fitted together if the two are fixed. However, when one or both of the two connectors is movable so as to absorb a dimensional error, the fitting operation can be carried out smoothly.

Furthermore, according to the invention, there is provided an automobile instrument panel wire harness-mounting construction in which an electric connection box attached to an instrument panel is connected to a wire harness mounted on the instrument panel, and the electric connection box has a collective-connecting connector portion for connection to wire harnesses mounted on a body; a second electric connection box attached to a body panel having a first collective-connecting connector portion fitted on the collective-connecting connector portion, and a plurality of second connector portions fitted onto connectors connected to a front harness, a floor harness, a roof harness and a door harness; and one or both of the electric connection boxes, attached respectively to the instrument panel and the body panel, comprise a movable-type electric connection box.

Specifically, in a preferred form of the invention, the electric connection box attached to the instrument panel comprises the movable-type electric connection box while the second electric connection box is fixedly mounted on the body panel. In the movable-type electric connection box, the resilient support members, each in the form of a rubber member or a spring, extend between the casing, which comprises the upper and lower cases and is fixed to the instrument panel, and the insulating plate, mounted within the casing, so that the insulating plate, the bus bar fixed to the insulating plate, and the collective-connecting connector portion connected to the bus bar are movable within the movable-type electric connection box. Therefore, when the collective-connecting connector portion of the movable-type electric connection box is to be fitted in the collective-connecting connector portion of the second electric connection box attached to the body panel, a fitting position of the collective-connecting connector portion of the movable-type electric connection box can be finely adjusted.

Where the connector portions of the two electric connection boxes, which are to be fitted together simultaneously when attaching the instrument panel to the body panel, are fixed to the panels, the two connector portions can not be easily fitted together if they are even slightly out of registry with each other. However, when one or both of the two connector portions are movable, the connector fitting operation can be carried out easily even when a dimensional error is produced by a slightly deviated direction of mounting of the instrument panel.

The function of the conventional junction box (fixed to the body panel after the instrument panel is attached to the body panel) is divided into that of the electric connection box, beforehand attached to the instrument panel, and that of the electric connection box beforehand attached to the body panel. Simultaneously when fixing the instrument panel to the body panel, the two electric connection boxes are fitted together, thereby connecting the instrument panel harnesses to the other wire harnesses at one time. With this construction, the connector fitting operation can be effected for all the connectors at one time, in contrast with the conventional construction, and therefore the time and labor required for the operation are greatly reduced. Specifically, it is no longer necessary, after the instrument panel is attached to the body panel, to fit the connectors of the wire harnesses into the electric connection box or to fix the electric connection box to the body after this connector fitting operation.

Preferably, the wire harness mounted on the instrument panel includes the instrument panel harness, and a cowl harness that does not include a power circuit, and the power circuit is connected to the electric connection box mounted on the body panel. Two kinds of wire harnesses (that is, an instrument panel harness and a cowl harness) which have be separate from each other in the conventional construction, are combined together into the wire harnesses mounted on the instrument panel except for the wire connected to the power circuit. With this arrangement it is necessary to arrange only one large-size wire harness in a narrow space between the instrument panel and the body panel, which improves the efficiency of the operation.

DETAILED DESCRIPTION OF THE PREFERRED EMBODIMENTS

The first embodiment of the present invention will now be described with reference to the drawings.

Figure 3:
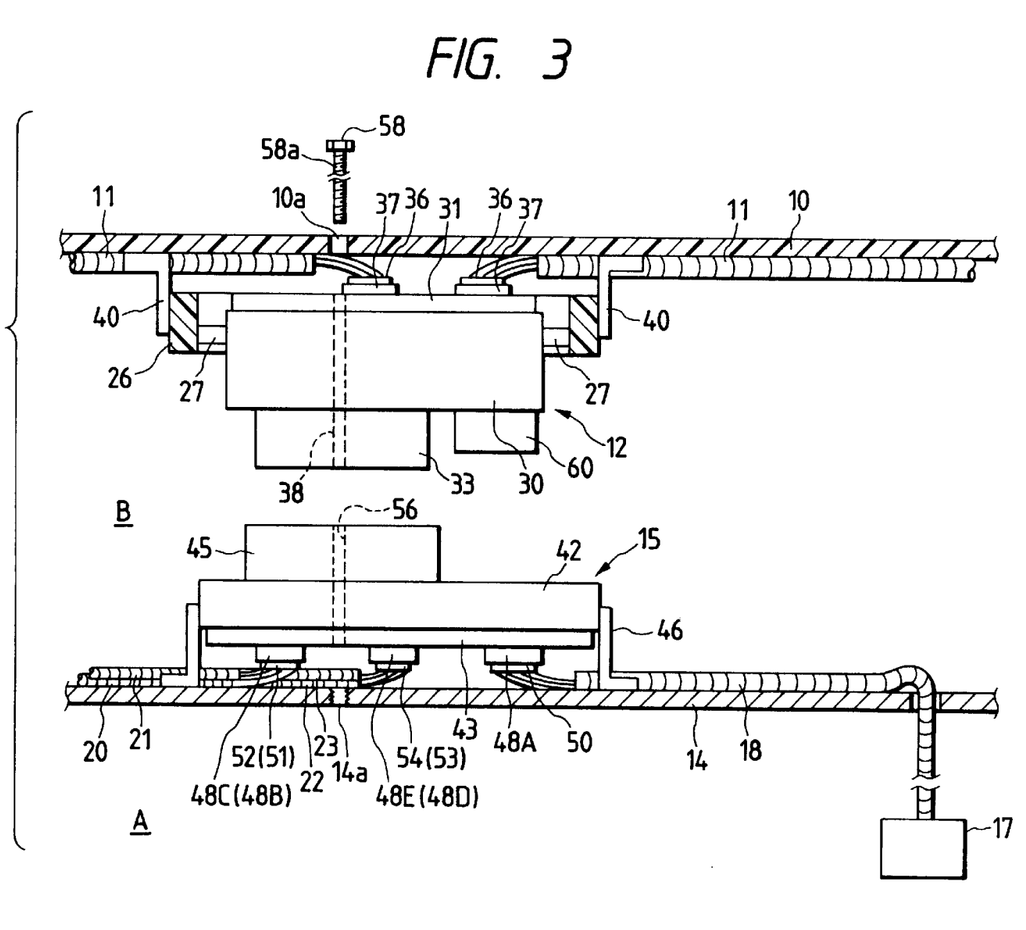
FIG. 3 is a plan view of a preferred embodiment of the present invention, showing a condition before an electric connection box attached to an instrument panel is fitted in a connector block attached to a body panel.
Figure 4:
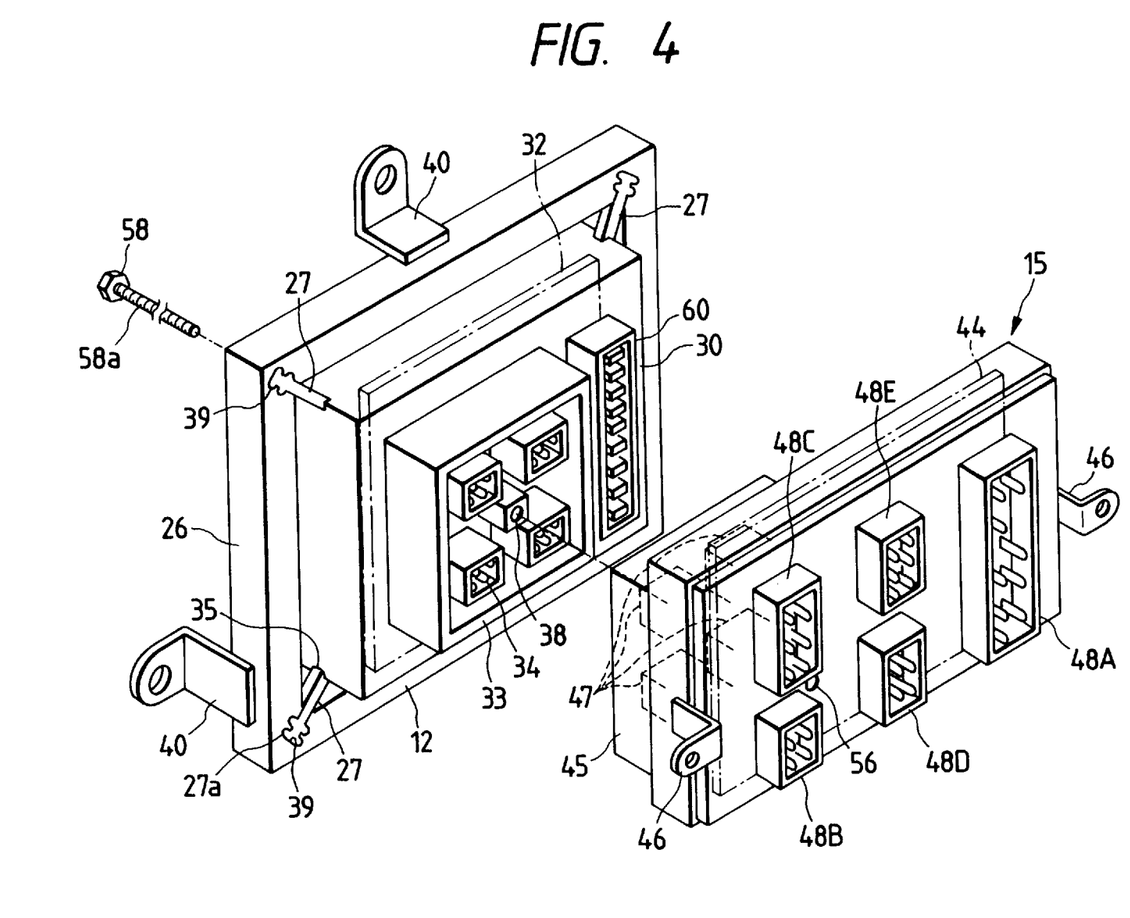
FIG. 4 is an exploded, perspective view showing the electric connection box and the connector block.

As shown in FIGS. 3 and 4, in a wire harness-mounting construction of the present invention, the function of the conventional junction box is divided into that of an electric connection box 12 (which is to be connected to wire harnesses 11 mounted along an instrument panel 10) and that of an electric connection box comprising a connector block 15 to be connected to wire harnesses mounted along a body panel (cowl panel) 14. The instrument panel 10 is attached to the body panel 14 in an automobile assembly line. The wire harnesses mounted on the instrument panel 10 are electrically connected respectively to the wire harnesses mounted on the body panel 14 by fitting the electric connection box 12 and the connector block 15 together simultaneously when attaching the instrument panel 10 to the body panel 14.

The wire harnesses 11, mounted on the instrument panel 10, include a conventional instrument panel harness, and a conventional cowl harness less a power circuit 18 connected to a power source 17. The wire harnesses 11 are arranged and held in position by clamps (not shown) on the instrument panel 10. Specifically, two kinds of wire harnesses (that is, an instrument panel harness and a cowl harness to be arranged between the instrument panel 10 and the body panel 14) which have been separate from each other in the conventional construction, are combined together into the wire harnesses 11 (which are to be attached to the instrument panel 10) including all the wires except the wire connected to the power circuit 18. The wire harnesses 11 are connected to the electric connection box 12, and with this construction the number of circuits which are to be electrically connected when the electric connection box 12 is fitted in the connector block 15 at their connector portions is reduced.

The wire harnesses, mounted on the body panel 14 separating an engine room side A and a compartment side B from each other, include the power circuit 18 connecting the power source 17 to the connector block 15. In this embodiment, a front harness 20, a floor harness 21, a roof harness 22 and a door harness 23 are connected to the connector block 15 through respective connectors.

The electric connection box 12 is mounted on an outer frame 26 (fixed to the instrument panel 10) through resilient support members 27, so that the electric connection box 12 is movable relative to the instrument panel 10 so as to absorb a dimensional error. The electric connection box 12 comprises an upper case 30 and a lower case 31, and a bus bar 32 (shown in phantom in FIG. 4), constituting an internal circuit, is mounted or housed within a space formed by the upper and lower cases 30 and 31. Relays and fuses 60, connected to this bus bar, are mounted on the electric connection box 12.

A collective-connecting connector portion 33 for connection to the connector block 15 is formed on an upper surface of the upper case 30. Male terminals 34, connected to the bus bar 32, are projected within the collective-connecting connector portion 33. Mounting portions 35 are provided respectively at four corners of an outer peripheral surface of the upper casing 30, and the resilient support members 27 are mounted respectively at the mounting portions 35. The mounting portion 35 is in the form of a hole formed in the upper case 30, and the resilient support member 27 is secured to the mounting portion 35 by a pin or the like extending through the resilient support member.

Connector fitting portions 37 are formed on a bottom surface of the lower case 31, and connectors 36 connected to ends of the wire harnesses 11 to be connected to the electric connection box 12 are fitted in the connector fitting portions 37.

A through hole 38 extends through the upper and lower cases 30 and 31 at a central portion of the collective-connecting connector portion 33, and a bolt (fastening member) 58 is passed through this through hole 38 so as to fasten the electric connection box 12 to the connector block 15.

The outer frame 26 of a square shape surrounds the case of the electric connection box 12, and is spaced a predetermined distance from the outer peripheral surface of this case. Mounting portions 39 are formed respectively at the inner sides of the four corners of the outer frame 26 respectively facing the mounting portions 35, and the resilient support members 27 are mounted respectively at the mounting portions 39. The mounting portions 39 are in the form of a groove extending downwardly from an upper surface of the outer frame 26, and a bulged portion 27a of the resilient support member 27 is engaged in this groove, thereby supporting the resilient support member 27. Brackets 40 are formed respectively on predetermined portions of the outer peripheral surface of the outer frame 26, and the outer frame 26 is attached to the instrument panel 10 through the brackets 40.

Figure 8:
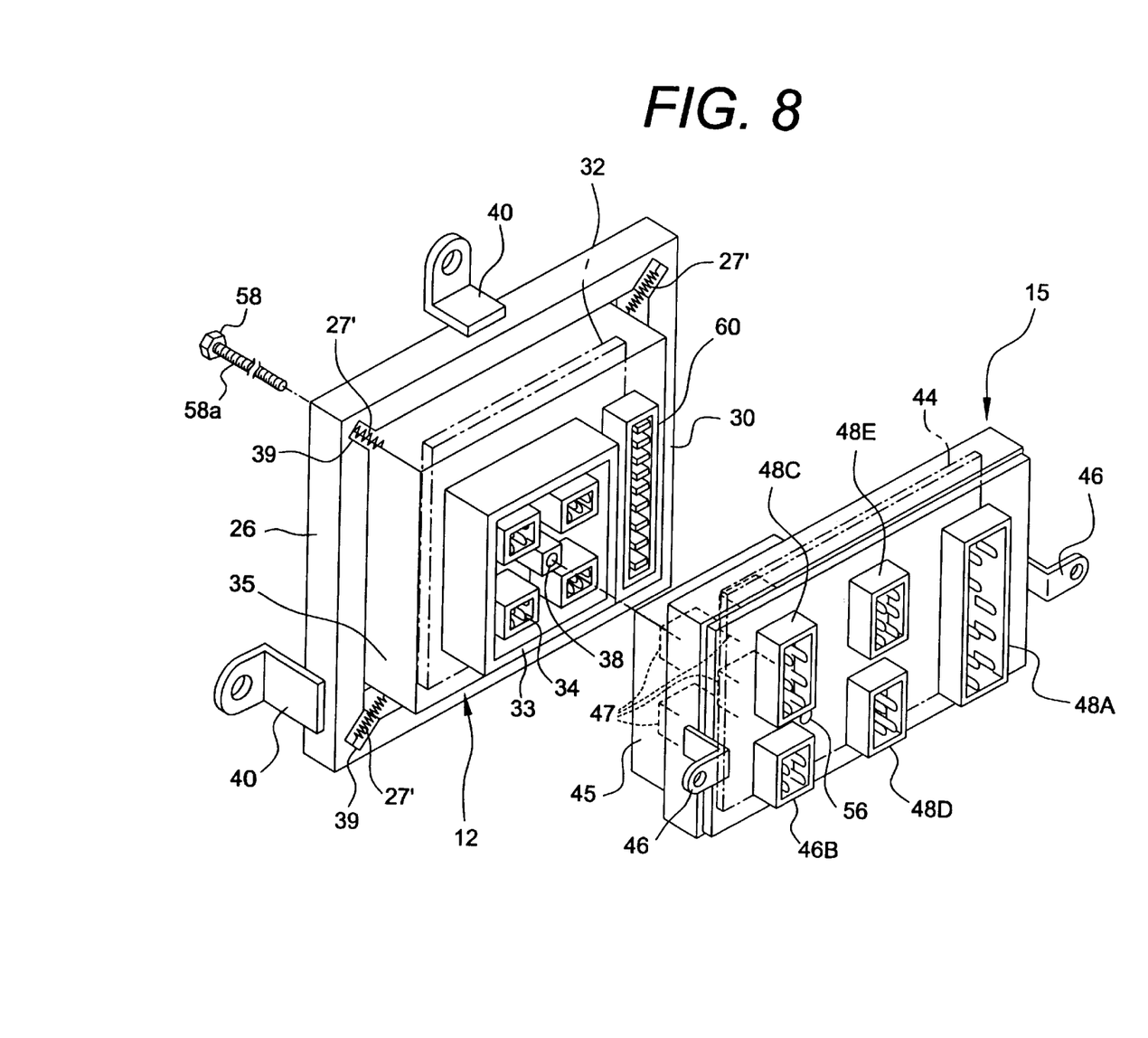
FIG. 8 is an exploded, perspective view showing the electric connection box and the connector block with resilient support members of an alternate construction.

The resilient support member 27 comprises a rubber member (FIG. 4) or a spring 271 (FIG. 8), and the resilient support members 27 support the electric connection box 12 within the outer frame 26 in such a manner that the electric connection box 12 is movable so as to absorb a dimensional error. A mounting portion (not shown), having a through hole through which the above-mentioned pin extends, is formed at one end of the resilient support member 27 which is inserted and retained in the mounting portion 35. The bulged portion 27a, which is engaged in the groove (mounting portion), is formed at the other end of the resilient support member 27 which is inserted and retained in the mounting portion 39 of the outer frame 26.

Like the electric connection box 12, the connector block 15 to be fixed to the body panel 14 comprises an upper case 42 and a lower case 43, and a bus bar 44 (shown in phantom in FIG. 4), constituting an internal circuit, is housed or mounted within a space formed by the cases 42 and 43.

A first collective-connecting connector portion 45 for fitting connection to the collective-connecting connector portion 33 is formed on an upper surface of the upper case 42. Female terminals 47, connected to the bus bar 44, are projected within the first collective-connecting connector portion 45, and are respectively fitted on and electrically connected to the male terminals 34 in the collective-connecting connector portion 33 when the first collective-connecting connector portion 45 and the collective-connecting connector portion 33 are fitted together. Brackets 46 are formed respectively on predetermined portions of the outer peripheral surface of the upper case 42, and the connector block 15 is attached to the body panel 14 through the brackets 46.

A plurality of second connector portions for fitting respectively on the plurality of wire harnesses are formed on the bottom surface of the lower case 43. In this embodiment, five second connector portions 48A to 48E are provided. A connector 50 of the power circuit 18 is fitted in the second connector portion 48A, and connectors 51, 52, 53 and 54, secured respectively to ends of the front harness 20, the floor harness 21, the roof harness 22 and the door harness 23, are fitted respectively in the second connector portions 48B to 48E.

The first collective-connecting connector portion 45 is connected to the second connector portions 48A to 48E by the bus bar 44 constituting the internal circuit.

A through hole 56 is formed through the upper and lower cases 42 and 43 at a central portion of the first collective-connecting connector portion 45, and this through hole 56 is aligned with the through hole 38.

In this embodiment, a through hole 10a is formed through the instrument panel 10, and a threaded hole 14a is formed through the body panel 14. A threaded shank 58a of the bolt 58 is passed through the aligned through holes 10a, 38 and 56 from the outer side of the instrument panel 10, and is threaded into the threaded hole 14a, thereby positively fitting the first collective-connecting connector portion 45 and the collective-connecting connector portion 33 together, and also securing the instrument panel 10 to the body panel 14. There may be used an arrangement in which a threaded hole is formed through the instrument panel 10 while a through hole is formed through the body panel 14, and the threaded shank 58a of the bolt 58 is passed through the through holes from the body panel side, and is threaded into the threaded hole in the instrument panel 10.

The process of connecting the wire harnesses 11 to the associated wire harnesses, using the electric connection box 12 and the connector block 15, will now be described.

First, before the instrument panel 10 is attached to the body panel 14, the wire harnesses 11 are arranged in position on the instrument panel 10, with the connectors 36 of the wire harnesses 11 fitted in the respective connector fitting portions 37 of the electric connection box 12. The brackets 40, formed on the outer frame 26 of the electric connection box 12, are secured by bolts to the inner side of the instrument panel 10, thereby fixing the electric connection box 12.

Similarly, the connector block 15 is fixedly secured to the body panel 14, and the connector 50 of the power circuit 18 and the connectors 51 to 54 of the wire harnesses 20 to 23 are fitted in and connected to the second connector portions 48A to 48E of the connector block 15, respectively. The power circuit 18 and the wire harnesses 20 to 23 are arranged in position on the body panel 14.

The fitting of the connectors 36 and 50 to 54, the attachment of the electric connection box 12 to the instrument panel 10, and the attachment of the connector block 15 to the body panel 14 can be effected in a wide space available before the instrument panel 10 is attached to the body panel 14, and therefore these operations can be carried out efficiently.

Then, the instrument panel 10 is attached to the body panel 14. At this time, the collective-connecting connector portion 33 of the electric connection box 12 is first brought into contact with the first collective-connecting connector portion 45 of the connector block 15. At this time, if the two connector portions 33 and 45 are even slightly out of registry with each other, the resilient support members 27 allow the electric connection box 12 to move, thereby eliminating this misregistration. Thus, the electric connection box .12 is movable, and therefore the fitting position is finely adjusted, so that the collective-connecting connector portion 33 and the first collective-connecting connector portion 45 can be easily fitted together.

Then, the threaded shank 58a of the bolt 58 is passed through the through holes 10a, 38 and 56 from the outer side of the instrument panel 10, and is threaded into the threaded hole 14a formed through the body panel 14. As a result, the collective-connecting connector portion 33 is fitted in and electrically connected to the first collective-connecting connector portion 45, and also the instrument panel 10 is fixedly secured to the body panel 14, thus completing all the mounting operations.

Thus, the connection of many connectors to the electric connection box (junction box), as well as the fixing of the electric connection box to the body panel, which could not be carried out easily in the conventional construction, need not be effected after the instrument panel 10 is fixedly secured to the body panel 14. Therefore the efficiency of mounting the wire harnesses can be greatly enhanced. Also, the connectors of the power circuit 18 and the wire harnesses 20 to 23 to be connected to the wire harnesses 11 mounted on the instrument panel 10 are fittedly connected to the connector block 15 mounted on the body panel 14 before the instrument panel 10 is attached to the body panel 14. Therefore the connector fitting operation can be carried out easily.

In this embodiment, the collective-connecting connector portion 33 and the first collective-connecting connector portion 45 are fitted and connected together by tightening the bolt 58, and therefore the two can be electrically connected together positively and easily. The bolt 58 for the fitting connection of the electric connection box 12 to the connector block 15 also serves as a fastening member for fixing the instrument panel 10 to the body panel 14, and therefore the time and labor required for the operation are reduced.

When disassembling the automobile, the instrument panel 10 can be easily removed from the body panel 14 by loosening the bolt 58, and the wire harnesses 11 can be removed from the instrument panel 10 in a separate, wide space. Therefore, the removal of the wire harnesses 11 can be effected efficiently.

The present invention is not to be limited to the above embodiment. For example, instead of using the bolt as the fastening member for fastening the electric connection box 12 and the connector block 15 together, there may be used a fastening rod (comprising a shaft member) having a retaining projection formed at its distal end, in which case the fastening rod is passed through the instrument panel, the electric connection box, the connector block and the body panel, and then is rotated so as to retain the retaining projection on the body panel.

In the above embodiment, although the electric connection box is movably mounted on the instrument panel through the resilient support members, the electric connection box, mounted on the instrument panel, may be fixed while the connector block, mounted on the body panel, may be movable. Alternatively, both the electric connection box on the instrument panel and the connector block on the body panel may be movable. Even if the electric connection box and the connector block are both movable, they will not be moved by vibrations developing during the travel of the automobile since the electric connection box and the connector block are fixed to the instrument panel and the body panel by the fastening member.

The second embodiment of the present invention will now be described in detail with reference to the drawings.

Figure 5:
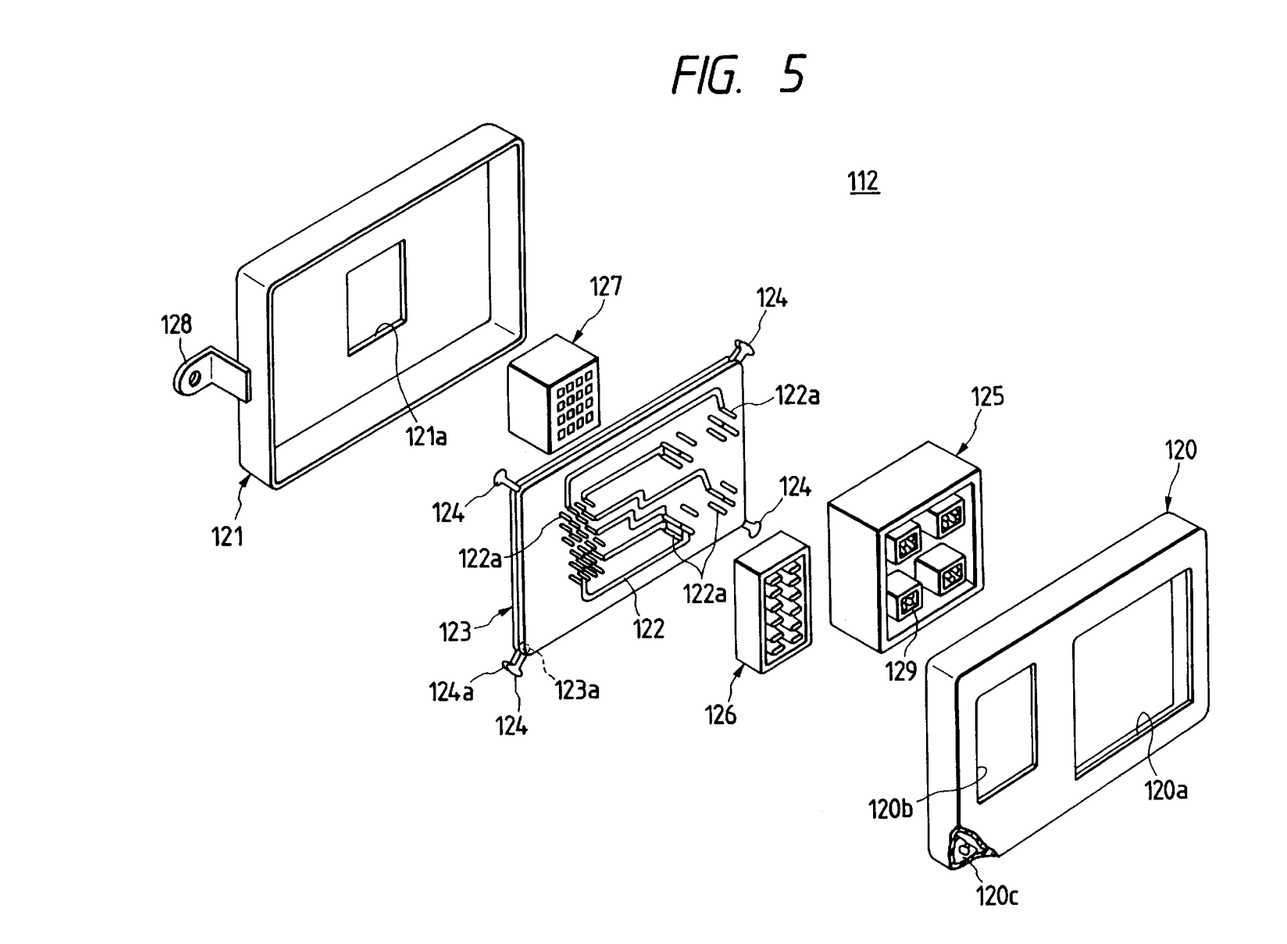
FIG. 5 is an exploded, perspective view of a movable-type electric connection box of the present invention.
Figure 6:
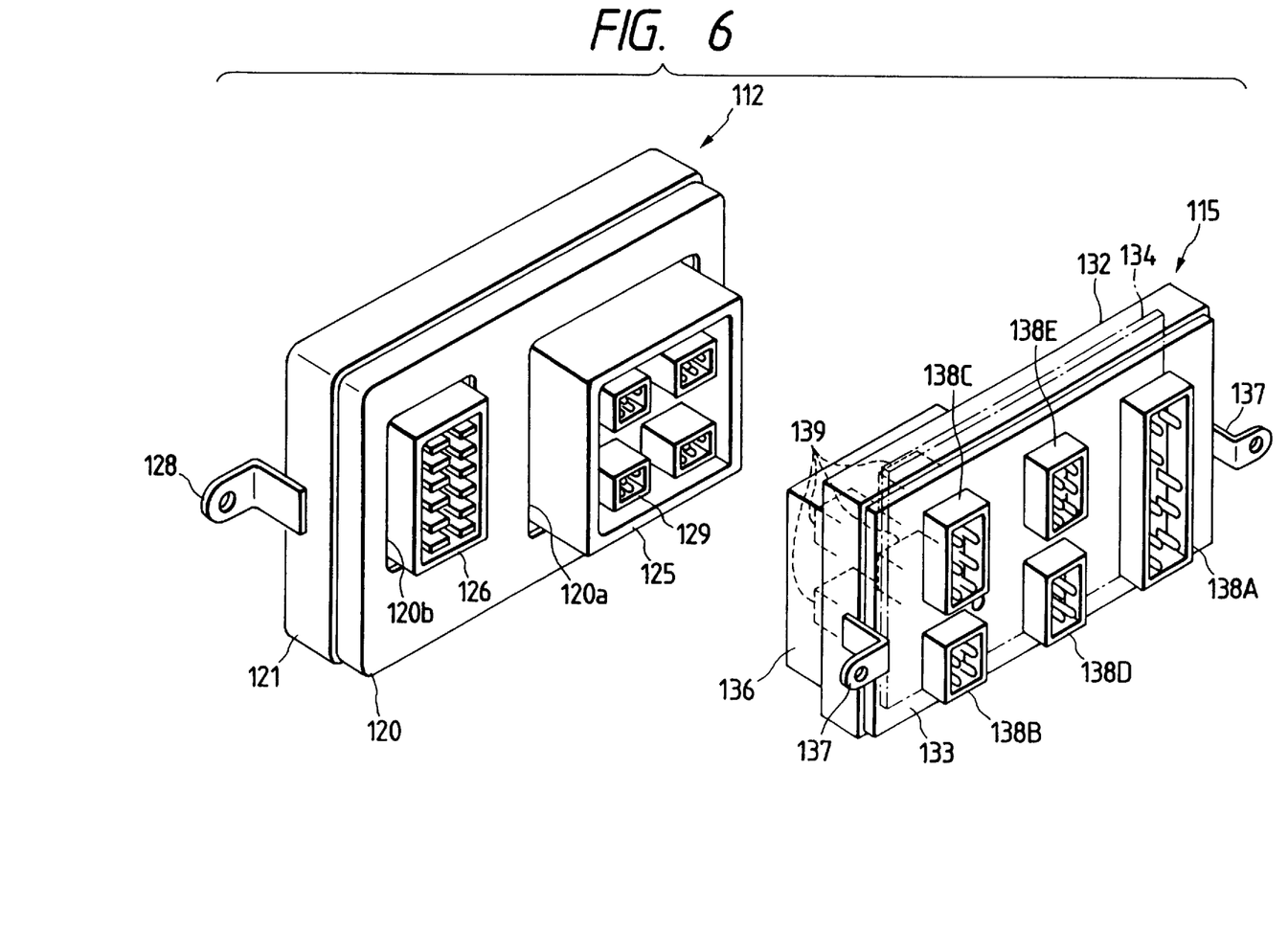
FIG. 6 is a perspective view showing a condition before the movable-type electric connection box, attached to an instrument panel, is fittedly connected to an electric connection box attached to a body panel.
Figure 7:
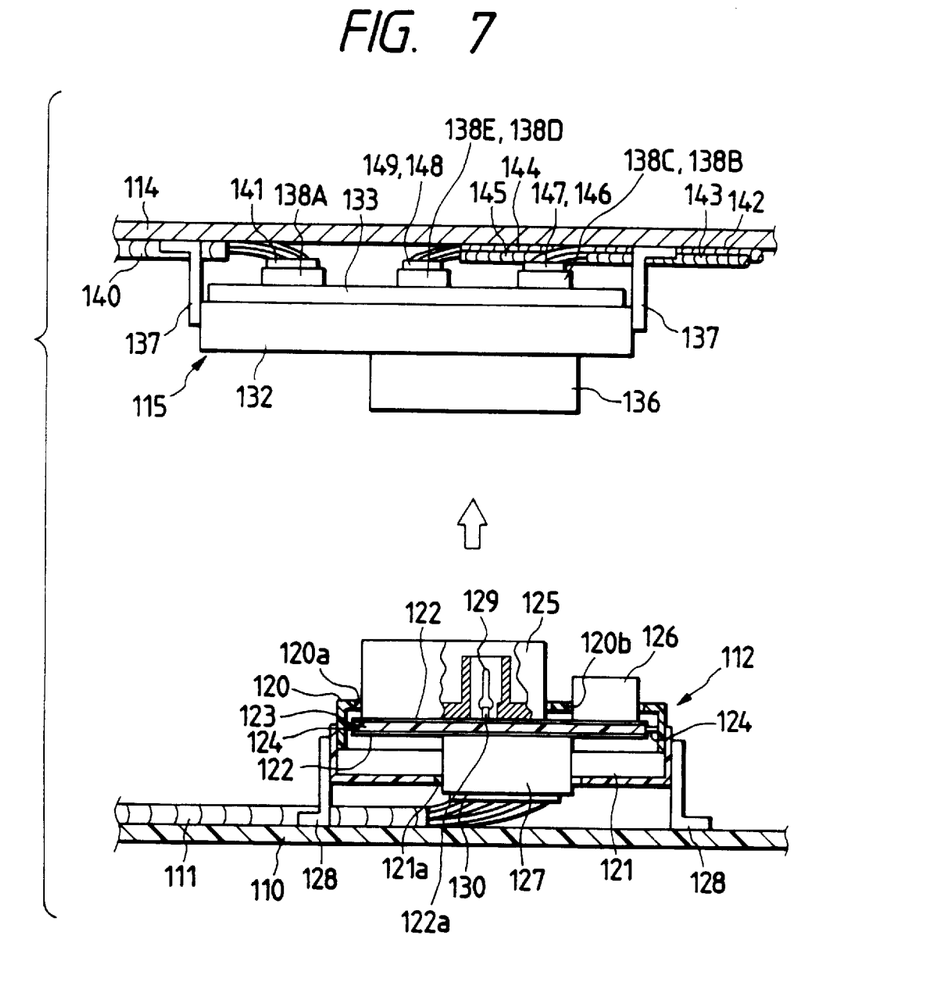
FIG. 7 is a cross-sectional view showing a condition before the instrument panel is fixed to the body panel.

In the present invention, as shown in FIGS. 5 to 7, a movable-type electric connection box 112 for connection to a wire harness 111 mounted on an instrument panel 110, as well as a fixed electric connection box 115 for connection to wire harnesses mounted on a body panel 114, is provided, and the function of the conventional electric connection box (that is, a junction box) is divided into that of the movable-type electric connection box 112 and that of the electric connection box 115. The wire harness 111, mounted on the instrument panel 110, is electrically connected to the wire harnesses mounted on the body panel 114 by fittingly connecting the two electric connection boxes 112 and 115 together simultaneously when attaching the instrument panel 110 to the body panel 114.

As shown in FIG. 5, in the movable-type electric connection box 112, an insulating plate 123, having bus bars 122 fixed thereto, is mounted within a casing, comprising an upper case 120 and a lower case 121, through resilient support members 124 so that the insulating plate 123 is movable relative to the casing. A collective-connecting connector 125 for connection to the electric connection box 115 on the body panel 114 is mounted on the insulating plate 123, and tabs 122a, formed on the bus bars 122, are fitted in the connector 125. The connector 125 is projected outwardly from the upper case 120 of the casing, and is movable together with the insulating plate 123 so as to adjust a connector fitting position.

In the movable-type electric connection box 112, a fuse block 126, having relays and fuses mounted thereon, and a harness connector 127 for connection to the wire harness 111 are fitted on tabs formed on the bus bars 122, and therefore like the connector 125, the fuse block 126 and the harness connector 127 are also movable relative to the casing.

The upper case 120 has a connector fitting hole 120a through which the collective-connecting connector 125 projects outwardly from the casing, and the upper case 120 also has a fuse fitting hole 120b through which the fuse block 126 projects outwardly from the casing. The peripheral edge of the fitting hole 120a surrounds an outer peripheral surface of the collective-connecting connector 125 in such a manner that a predetermined gap is formed therebetween, and also the peripheral edge of the fitting hole 120b surrounds an outer peripheral surface of the fuse block 126 in such a manner that a predetermined gap is formed therebetween. With this arrangement, the connector 125 and the fuse block 126 are inserted into the casing, and are movable relative to the casing. Mounting portions 120c each in the form of a groove are formed respectively in four corners of the upper case 120, and a mounting portion 124a, formed at one end of each resilient support member 124, is inserted in and fixed to the corresponding mounting portion 120c.

The lower case 121 has a connector fitting hole 121a through which the harness connector 127 projects outwardly from the casing. As described above for the fitting holes 120a and 120b, the peripheral edge of the connector fitting hole 121a surrounds an outer peripheral surface of the harness connector 127 in such a manner that a predetermined gap is formed therebetween, and the harness connector 127 is inserted into the casing, and is movable relative to the casing. Brackets 128 are formed respectively at predetermined portions of the outer peripheral surface of the lower case 121, and the casing is attached to the instrument panel 110 through these brackets 128.

The bus bars 122 are fixedly secured to the opposite sides or faces of the insulating plate 123 in predetermined patterns. In the case where the insulating plate 123 is of a laminated construction, with bus bars interposed between layers of the laminated insulating plate 123, each of tabs, formed on the bus bars, extends through the corresponding layer of the insulating plate 123, and is fitted in an associated one of the above connectors and a fuse.

Mounting portions 123a are provided respectively at four corners of the insulating plate 123, and the resilient support members 124 are fixedly secured respectively to the mounting portions 123a. The mounting portion 123a is in the form of a groove formed in the peripheral edge of the insulating plate 123, and one end of the resilient support member 124 is inserted into the mounting portion 123a, and is fixed thereto by a pin or the like extending through the resilient support member 124.

The resilient support member 124 comprises a rubber member or a spring, and the resilient support members 124 extend and are connected between the upper case 120 and the insulating plate 123, so that the insulating plate 123 is movable within the casing together with the bus bars 122 and the collective-connecting connector 125, the fuse block 126 and the harness connector 127 which are connected to the bus bars 122.

Male terminals 129, connected respectively to the corresponding tabs 122a of the bus bars 122, are projected within the collective-connecting connector 125. By fitting the male terminals 129 respectively on these tabs 122a, the collective-connecting connector 125 is mounted or held on the insulating plate 123, and in an assembled condition of the movable-type electric connection box 112, the connector 125 is movable within the connector fitting hole 120a through the resilient support members 124 and the insulating plate 123.

Similarly, terminals (not shown), connected respectively to the corresponding tabs 122a of the bus bars 122, are provided within the fuse block 126, and by fitting these terminals respectively on these tabs 122a, the fuse block 126 is mounted or held on the insulating plate 123. similarly, the harness connector 127 has terminals (not shown) connected respectively to the corresponding tabs 122a of the bus bars 122, and by fitting these terminals on these tabs 122a, the harness connector 127 is mounted or held on the insulating plate 123. A connector 130, secured to an end of the wire harness 111 mounted on the instrument panel 110, is fitted in and connected to the harness connector 127.

The electric connection box 115, fixed to the body panel 114, comprises an upper case 132 and a lower case 133. A bus bar 134, constituting an internal circuit, is mounted within a space formed by cases 132 and 133. A first collective-connecting connector portion 136 for fitting connection to the collective-connecting connector 125 of the movable-type electric connection box 112 is formed on an upper surface of the upper case 132. Female terminals 139, fitted respectively on corresponding tabs of the bus bar 134, are mounted within the first collective-connecting connector portion 136, and these female terminals 139 are respectively fitted on and electrically connected to the male terminals 129 in the collective-connecting connector 125 of the movable-type electric connection box 112. Brackets 137 are formed respectively on predetermined portions of an outer peripheral surface of the upper case 132, and the electric connection box 115 is fixed to the body panel 114 through these brackets 137.

A plurality of second connector portions for fitting connection respectively to a plurality of wire harnesses are formed on a bottom surface of the lower case 133. In this embodiment, five second connectors 138A to 138E are provided, and a connector 141 of a power circuit 140 (described later) is fitted in the second connector 138A, and connectors 146 to 149, secured respectively to ends of a front harness 142, a floor harness 143, a roof harness 144 and a door harness 145, are fitted respectively in the second connectors 138B to 138E.

The wire harness 111, connected to the movable-type electric connection box 112 mounted on the instrument panel 110, include a conventional instrument panel harness and a conventional cowl harness less a power circuit. Specifically, two kinds of wire harnesses (that is, an instrument panel harness and a cowl harness), which have been separate from each other in the conventional construction, are combined together into the wire harness 111 (to be mounted on the instrument panel 110) including all the wires except a wire connected to the power circuit 140.

The process of connecting the wire harness 111 to the other wire harnesses 140 and 142 to 145, using the two electric connection boxes 112 and 115, will now be described.

First, before the instrument panel 110 is attached to the body panel 114, the wire harness 111 is arranged in position on the instrument panel 110, with the connector 130 of the wire harness 111 fitted in the harness connector 127 of the movable-type electric connection box 112. The brackets 128 on the movable-type electric connection box 112 are secured by bolts to the inner side of the instrument panel 110, thereby fixing the movable-type electric connection box 112.

Similarly, the electric connection box 115 is fixedly secured to the body panel 114, and the connector 141 of the power circuit 140 and the connectors 146 to 149 of the wire harnesses 142 to 145 are fitted in and connected to the second connector portions 138A to 138E of the electric connection box 115, respectively.

The fitting of the connectors 130, 141 and 146 through 149, the attachment of the movable-type electric connection box 112 to the instrument panel 110, and the attachment of the electric connection box 115 to the body panel 114 can be effected in a wide space available before the instrument panel 110 is attached to the body panel 114, and therefore these operations can be carried out efficiently.

Then, the instrument panel 110 is attached to the body panel 114. At this time, the collective-connecting connector 125 of the movable-type electric connection box 112 is first brought into contact with the first collective-connecting connector portion 136 of the electric connection box 115 fixed to the body panel 114. At this time, if the collective-connecting connector 125 and the first collective-connecting connector portion 136 are even slightly out of registry with each other, or if the direction of mounting of the instrument panel 110 is even slightly deviated, the resilient support members 124 within the movable-type electric connection box 112 expand and contract to allow the collective-connecting connector 125 to move relative to the casing through the insulating plate 123, thereby absorbing a dimensional error.

Thus, in the movable-type electric connection box 112, the collective-connecting connector 125 is movable relative to the casing, and therefore an error of the fitting position relative to the mating first connector portion 136 is absorbed, so that the collective-connecting connector 125 can be easily fitted in the first collective-connecting connector portion 136. Particularly when the connectors are of the multi-pole type, two connector portions can not be easily fitted together if the two are fixed. In this embodiment, however, the collective-connecting connector 125 of the movable-type electric connection box 112 is movable so as to absorb a dimensional error, and therefore the fitting operation can be carried out smoothly.

In the above condition, the instrument panel 110 is pressed toward the body panel 114, so that the collective-connecting connector 125 of the electric connection box 112 is fitted in and electrically connected to the first collective-connecting connector portion 136 of the electric connection box 115. In this condition, the instrument panel is fastened or fixed to the body panel 114 by bolts or the like.

Thus, in the construction of mounting the wire harness 111 by the use of the movable-type electric connection box 112, the connection of many connectors to the electric connection box (junction box), as well as the fixing of the electric connection box to the panel, which could not be carried out easily in the conventional construction, need not be effected after the instrument panel 110 is fixedly secured to the body panel 114. Therefore the efficiency of the mounting operations can be greatly enhanced. Also, simultaneously when attaching the instrument panel 110 to the body panel 114, the two electric connection boxes 112 and 115 are fitted together, thereby electrically connecting the wire harness 111 on the instrument panel 110 to all the wire harnesses on the body panel 114 at one time. Therefore the time and labor required for the operation are greatly reduced.

In this embodiment, two kinds of wire harnesses (that is, an instrument panel harness and a cowl harness) which have been separate from each other, are combined together into the wire harness 111 (to be mounted on the instrument panel 110) including all the wires except the wire connected to the power circuit 140, and therefore it is necessary to arrange only one large-size wire harness in the narrow space between the instrument panel 110 and the body panel 114, which can improve the efficiency of mounting the wire harness.

The present invention is not to be limited to the above embodiment. For example, although the movable-type electric connection box 112 is mounted on the instrument panel 110, it may be mounted on the body panel 114. Alternatively, both of the electric connection boxes, mounted on the instrument panel 110 and the body panel 114 may be of the movable type.

As is clear from the above description, the electric connection box of the present invention is movably mounted on the large-size panel, and therefore the connector portion of the electric connection box can be easily fitted in the mating connector portion while absorbing a dimensional error.

The pair of electric connection boxes are mounted respectively on the instrument panel and the body panel, and the electric connection box, mounted on one (for example, the instrument panel) of the panels, is movable relative to the outer frame. Where the connector portions of the two electric connection boxes, which are to be fitted together simultaneously when attaching the large-size instrument panel to the body panel, are fixed to the panels, the two connector portions can not be easily fitted together if they are even slightly out of registry with each other. However, when one or both of the two electric connection boxes are movable, the connector fitting operation can be carried out easily even when a dimensional error is produced by a slightly deviated direction of mounting of the instrument panel.

The pair of electric connection boxes are fitted together simultaneously when attaching the instrument panel to the body panel, thereby connecting the instrument panel harnesses to all the other wire harnesses at one time. With this construction, the connector fitting operation can be carried out at one time, thereby greatly reducing the time and labor required for this operation. Specifically, the connection of many connectors to the junction box, which could not be effected easily in the conventional construction since this must be manually carried out in a narrow space, is not necessary, and also the fixing of the junction box to the body panel is not necessary, and therefore the efficiency of the mounting of the wire harnesses is greatly enhanced.

The two electric connection boxes, at least one of which is movable, are fixed to each other by a fastening member such as a bolt, and with this construction the shaking of the electric connection boxes due to vibrations developing during the travel of the automobile is positively prevented. This fastening member is also used to fix the large-size panels (that is, the instrument panel and the body panel) together, and therefore the time and labor required for the operation are reduced.

What is claimed is:

1. A movable-type electric connection box, comprising:

an insulating plate having a bus bar fixed thereto mounted within a casing, comprising an upper case and a lower case, through resilient support members so that said insulating plate is movable relative to said casing; and connectors fittingly connected to tabs formed on said bus bar, and inserted into said casing through respective connector fitting holes formed through at least one of said upper case and said lower case, and projected outwardly from said casing in such a manner that a gap is formed between an outer peripheral surface of each of said connectors and a peripheral edge of the associated connector fitting hole; wherein each of said connectors is movable to a fitting position.

2. An automobile instrument panel wire harness-mounting construction comprising:

a first electric connection box attached to an instrument panel connected to a wire harness mounted on said instrument panel, said first electric connection box having a collective-connecting connector portion for connection to wire harnesses mounted on a body;

a second electric connection box attached to a body panel, which comprises a first collective-connecting connector portion for fitting to said collective-connecting connector portion, and a plurality of second connector portions for fitting to a corresponding plurality of wire harnesses; and at least one of said first and second electric connection boxes comprise the movable-type electric connection box according to claim 1.

3. An automobile instrument panel wire harness-mounting construction according to claim 2, wherein said first electric connection box comprises said movable-type electric connection box while said second electric connection box is fixedly mounted on said body panel; in said movable-type electric connection box, the resilient support members, each in the form of a rubber member or a spring, extend between the casing, which is fixed to said instrument panel, and the insulating plate mounted within said casing, so that the insulating plate, the bus bar fixed to said insulating plate, and the collective-connecting connector portion connected to said bus bar are movable within said movable-type electric connection box; and a fitting position of said collective-connecting connector portion of the first electric connection box can be adjusted when said collective-connecting connector portion is fitted to the collective-connecting connector portion of said second electric connection box attached to said body panel.

* * * * *

UNITED STATES PATENT AND TRADEMARK OFFICE
CERTIFICATE OF CORRECTION

PATENT NO.   : 5,857,863
DATED        : January 12, 1999
INVENTOR(S)  : Takahiro Onizuka, et. al.

It is certified that error appears in the above-identified patent and that said Letters Patent is hereby corrected as shown below:

Title page, item [73], Assignee: should read as following:

Harness System Technologies Research, Ltd., Nagoya, JAPAN; Sumitomo Wiring Systems, Ltd., Yokkaichi, JAPAN; and Sumitomo Electric Industries, Ltd., Osaka, JAPAN Signed and Sealed this Twenty-first Day of September, 1999

Attest:

Q. TODD DICKINSON

*Attesting Officer*    *Acting Commissioner of Patents and Trademarks*